US010768294B2

United States Patent
Boufounos et al.

(10) Patent No.: US 10,768,294 B2
(45) Date of Patent: Sep. 8, 2020

(54) SYSTEM AND METHOD FOR MULTIMODAL, MOTION-AWARE RADAR IMAGING

(71) Applicant: Mitsubishi Electric Research Laboratories, Inc., Cambridge, MA (US)

(72) Inventors: Petros T Boufounos, Winchester, MA (US); Hassan Mansour, Boston, MA (US); Rakshith Sharma Srinivasa, Atlanta, GA (US); Jeroen van Baar, Arlington, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 330 days.

(21) Appl. No.: 15/924,710

(22) Filed: Mar. 19, 2018

(65) Prior Publication Data
US 2019/0285740 A1    Sep. 19, 2019

(51) Int. Cl.
*G01S 13/86*    (2006.01)
*G01S 13/90*    (2006.01)
(Continued)

(52) U.S. Cl.
CPC .......... *G01S 13/9005* (2013.01); *G01S 7/415* (2013.01); *G01S 13/72* (2013.01); *G01S 13/867* (2013.01);
(Continued)

(58) Field of Classification Search
CPC ...... G01S 13/72; G01S 13/867; G01S 13/887; G01S 13/89; G01S 13/9005;
(Continued)

(56) References Cited

U.S. PATENT DOCUMENTS

| 4,050,068 A | 9/1977 | Berg et al. |
| 5,134,409 A | 7/1992 | De Groot |

(Continued)

FOREIGN PATENT DOCUMENTS

| CN | 106919895 | 6/2016 |
| DE | 102010051207 A1 | 5/2012 |

(Continued)

OTHER PUBLICATIONS

Zhuravlev et al., "ISAR for Concealed Objects Imaging," Visual Communications and Image Processing; Jan. 20, 2004. San Jose, CA. vol. 9401, Mar. 12, 2015. pp. 940101-940101.
(Continued)

*Primary Examiner* — Timothy A Brainard
(74) *Attorney, Agent, or Firm* — Gennadiy Vinokur; James McAleenan; Hironori Tsukamoto

(57) ABSTRACT

A radar imaging system to reconstruct a radar reflectivity image of a scene including an object moving with the scene, includes an optical sensor to track the object over a period of time including multiple time steps to produce, for each of the multiple time steps, a deformation of a nominal shape of the object, and an electromagnetic sensor to acquire snapshots of the scene over the multiple time steps to produce a set of radar reflectivity image of the object with deformed shapes defined by the corresponding deformations of the nominal shape of the object. The system also includes a processor configured to determine, for each of the multiple time steps using the deformation determined for the corresponding time step, a transformation between the radar reflectivity image of the object acquired by the electromagnetic sensor at the corresponding time step and a radar reflectivity image of the object in the prototypical pose, and to combine the radar reflectivity images of the object with deformed shapes transformed with the corresponding trans- (Continued)

formations to produce the radar reflectivity image of the object in the prototypical pose.

20 Claims, 12 Drawing Sheets

(51) Int. Cl.
    *G06T 3/00*         (2006.01)
    *G01S 13/88*       (2006.01)
    *G01S 13/72*       (2006.01)
    *G06K 9/62*        (2006.01)
    *G01S 7/41*         (2006.01)
    *G01S 13/89*       (2006.01)

(52) U.S. Cl.
    CPC ............ *G01S 13/887* (2013.01); *G01S 13/89* (2013.01); *G01S 13/9029* (2013.01); *G06K 9/6288* (2013.01); *G06T 3/0087* (2013.01); *G01S 13/9064* (2019.05)

(58) Field of Classification Search
    CPC .. G01S 13/9029; G01S 13/9064; G01S 7/415; G06K 9/6288; G06T 3/0087
See application file for complete search history.

(56) References Cited

U.S. PATENT DOCUMENTS

| | | |
|---|---|---|
| 9,500,746 B2 | 11/2016 | Miles |
| 10,222,466 B2 * | 3/2019 | Schiessl .................... G01S 7/40 |
| 2011/0267221 A1 | 11/2011 | Brundick et al. |
| 2015/0241563 A1 | 8/2015 | Veiga et al. |

FOREIGN PATENT DOCUMENTS

| | | |
|---|---|---|
| RU | 2564693 C3 | 10/2015 |
| WO | 2015075072 A1 | 11/2014 |
| WO | 2017032977 A1 | 3/2017 |

OTHER PUBLICATIONS

Zhuravlev et al., "Inverse Sythetic Aperture Radar Imaging for Concealed Object Detection on a Naturally Walking Person," Visual Communications and Imaging Processing; Jan. 20, 2004. San Jose, Ca. vol. 9074, May 29, 2014. pp. 907402.

* cited by examiner

SYSTEM AND METHOD FOR MULTIMODAL, MOTION-AWARE RADAR IMAGING

TECHNICAL FIELD

The present disclosure relates generally to radar systems, and more particularly radar imaging of an object moving in a scene.

BACKGROUND

High-resolution radar imaging is a requirement in a variety of remote sensing applications. For example, radar reflectivity imaging is used in various security, medical, and through-the-wall imaging (TWI) applications. Whereas the down-range resolution is mostly controlled by the bandwidth of the transmitted pulse, the cross-range (azimuth) resolution depends on the aperture of the radar sensors. Typically, the larger the aperture, the higher the image resolution is, regardless of whether the aperture is physical (a large antenna) or synthetic (a moving antenna). Currently, the increase of the physical size of antenna leads to a significant increase of the cost of the radar system. To that end, a number of radar imaging systems use synthetic-aperture methods to reduce the size of the antennas and the cost of radar imaging. For example, synthetic-aperture radar (SAR) and inverse SAR (ISAR) use the relative motion of the radar antenna and an object in the scene to provide finer spatial resolution with comparatively small physical antennas, i.e., smaller than the antennas of beam-scanning radars.

However, the small size of physical antennas of radar systems makes the tracking of deformable moving objects difficult. Specifically, tracking objects exhibiting arbitrary motion and deformation requires tracking sensitivity with minimum resolution greater than the resolution of the physical antennas resulting in an impractical cost of the radar imaging system. To that end, conventional radar and/or other electromagnetic or acoustic wave imaging systems require the object to be standing still in the scene or moving in a very controlled rigid motion. Even for the rigid motion, conventional radar imaging systems require a challenging tracking step to estimate the motion parameters of the moving object using only the radar data, before a radar image can be formed, see, e.g., Martorella 2014. (Martorella, M. (2014). *Introduction to inverse synthetic aperture radar. In Academic Press Library in Signal Processing* (Vol. 2, pp. 987-1042). Elsevier.)

Therefore, there is a need for radar imaging systems and methods suitable for tracking an arbitrarily deformable moving object, using radar antennas of comparatively small aperture.

SUMMARY

It is an object of some embodiments to provide a radar imaging system that allows tracking the motion of an object even if the object is deformable and the motion is not rigid. It is a further object of some embodiments to provide such a radar imaging system that can reconstruct a radar reflectivity image of the object moving in a scene with a resolution greater than a resolution governed by practically sized physical antennas of electromagnetic sensors acquiring radar reflectivity images. It is another object of some embodiments to provide a radar imaging system suitable for airport security application allowing a person to freely move in front of radar imaging system while reconstructing a radar reflectivity image of the person.

Some embodiments are based on recognition that one of the reason preventing electromagnetic sensors of a radar imaging system to track a moving object is a resolution of the electromagnetic sensing governed by a physical size of the antennas of the sensors. Specifically, for the practical reasons, the size of the antennas of the radar imaging system can allow to estimate only coarse image of the object at each time step. Such a coarse image can be suitable to track an object subject to rigid and finite transformation, but can fail to recognize arbitrarily non-rigid transformation typical for the motion of a human.

Some embodiments are based on recognition that a radar imaging system can jointly use measurements of a scene acquired over multiple time steps. Such a system of measurements can be used to improve the resolution of the radar reflectivity image beyond a resolution governed by the size of the antennas of the radar imaging system. However, when the object is moving over time, at different time steps, the object can be located at different position and can have a different shape caused by the non-rigid motion. Such a dislocation and deformation of the object make the system of measurements ambiguous, i.e., ill-posed, and difficult or impractical to solve.

Some embodiments are based on realization that for a number of applications, it is sufficient to determine a radar reflectivity image of an object at some prototypical pose, not necessarily at a current pose that object has at a current instance of time. For example, for some security applications, the prototypical pose of a person is standing, with the hands extended upwards or sideways. The object arranged in the prototypical pose has a nominal shape that can change, i.e., deform, as the object moves.

Not rigidly moving objects can have different shape at different instances of time. To that end, at different time steps there can be different deformations of the shape of the object with respect to its nominal shape and different transformations of a radar reflectivity image observed by the radar imaging system with respect to a radar reflectivity image of the object arranged in the prototypical pose. Some embodiments are based on understanding that the transformations of the radar reflectivity images can be inferred from tracking the deformation of the shape of the object. The transformations to the radar reflectivity image of the object arranged in the prototypical pose provide the commonality to the system of measurements, such that knowing the transformations can help to resolve the ambiguity of the system of measurements and to solve the system of measurements with methods similar to the methods synthetic-aperture image reconstruction with a stationary object. However, as discussed above, the resolution of the radar reflectivity images govern by the physical size of the antennas of the electromagnetic sensors can be insufficient to track the moving object.

Some embodiments are based on another realization that a transformation of the radar reflectivity image can be inferred using object tracking in a different modality. For example, some embodiments use a realization that the transformation can be seen as a subsampled permutation that permutes and/or removes different points of the radar reflectivity image of the object in the prototypical pose in dependence of the deformation of the nominal shape of the object in the prototypical pose. However, for the purpose of radar image reconstruction, the reflectivity of each point in the radar reflectivity images does not change with the deformation of the object. Furthermore, the points of in the radar reflectivity image correspond to points in a reflectivity image of a different modality, such as an optical reflectivity. Thus, a reflectivity of a different modality, such as an optical reflectivity, can capture the same motion and deformation of the object as the radar reflectivity.

Some embodiments are based on recognition that optical sensors, such as monochrome or color or infrared video cameras, or depth cameras or a combination thereof, are cheaper than electromagnetic sensor with comparable resolution. Hence, an optical sensor can be used for tracking the motion of the target, even if the target is deformable and the motion is not rigid. Further, some embodiments are based on another recognition that in a number of applications where radar imaging of deformable objects is necessary and useful, the object is moving sufficiently close and visible to the radar imaging system such that optical sensors can provide sufficient accuracy for tracking. To that end, some embodiments are based on realization that by aiding the radar reconstruction using the optical motion tracking, the radar imaging system can be able to image very complex target objects that are moving.

An example where the target is clearly visible is security applications, in which people walk in front of a scanning system, e.g., in an airport. In some airport security scanners require subjects to be standing in a specific pose to be scanned for prohibited items. The scanning system according to one embodiment allows the subjects (which are the deformable moving objects, such as humans) to simply walk through the scanner while they are scanned, without any need to stop.

Accordingly, one embodiment discloses a radar imaging system configured to determine a radar reflectivity image of a scene including an object moving with the scene. The radar imaging system includes an optical sensor to track the object over a period of time to produce, for each time step, a deformation of a nominal shape of the object. As used herein, the nominal shape of the object is a shape of the object arranged in a prototypical pose.

The radar imaging system also includes at least one electromagnetic sensor, such as a mmWave sensor, a THz imaging sensor, or a backscatter X-Ray sensor, or combinations thereof, to acquire snapshots of the object over the multiple time steps. Each snapshot includes measurements representing a radar reflectivity image of the object with a deformed shape defined by the corresponding deformation. In various embodiments, the object can have a non-rigid motion, such that at least two different snapshots include radar reflectivity images of the object with different deformed shapes.

The radar imaging system also includes a processor to determine, for each time step using the deformation determined for the corresponding time step, a transformation between the radar reflectivity image of the object in the snapshot and a radar reflectivity image of the object in the prototypical pose. After determining the transformation, the processor determines a prototypical radar reflectivity image of the object in the prototypical pose such that, in each snapshot, the prototypical radar reflectivity image transformed with the corresponding transformation matches each of the radar reflectivity images of the object. In such a manner, the cooperative operation of optical and electromagnetic sensor allows to track the moving object with the resolution sufficient for reconstructing the radar reflectivity image of the object in a prototypical pose.

Accordingly, one embodiment discloses a radar imaging system to reconstruct a radar reflectivity image of a scene including an object moving with the scene. The system includes an optical sensor to track the object over a period of time including multiple time steps to produce, for each of the multiple time steps, a deformation of a nominal shape of the object, wherein the nominal shape of the object is a shape of the object arranged in a prototypical pose; at least one electromagnetic sensor to acquire snapshots of the scene over the multiple time steps to produce a set of radar reflectivity image of the object with deformed shapes defined by the corresponding deformations of the nominal shape of the object, wherein at least two different radar reflectivity images include the object with different deformed shapes; and a processor to determine, for each of the multiple time steps using the deformation determined for the corresponding time step, a transformation between the radar reflectivity image of the object acquired by the electromagnetic sensor at the corresponding time step and a radar reflectivity image of the object in the prototypical pose; and to combine the radar reflectivity images of the object with deformed shapes transformed with the corresponding transformations to produce the radar reflectivity image of the object in the prototypical pose.

Another embodiment discloses a method for reconstructing a radar reflectivity image of a scene including an object moving with the scene, wherein the method uses a processor operatively connected to an optical sensor and an electromagnetic sensor, wherein the processor is coupled with stored instructions implementing the method, wherein the instructions, when executed by the processor carry out steps of the method. The method includes tracking, using the optical sensor, the object over a period of time including multiple time steps to produce, for each of the multiple time steps, a deformation of a nominal shape of the object, wherein the nominal shape of the object is a shape of the object arranged in a prototypical pose; acquiring, using the electromagnetic sensor, snapshots of the scene over the multiple time steps to produce a set of radar reflectivity images of the object with deformed shapes defined by the corresponding deformations of the nominal shape of the object, wherein at least two different radar reflectivity images include the object with different deformed shapes; determining, for each of the multiple time steps using the deformation determined for the corresponding time step, a transformation between the radar reflectivity image of the object acquired by the electromagnetic sensor at the corresponding time step and a radar reflectivity image of the object in the prototypical pose; and combining the radar reflectivity images of the object with deformed shapes transformed with the corresponding transformations to produce the radar reflectivity image of the object in the prototypical pose.

Yet another embodiment discloses a non-transitory computer readable storage medium embodied thereon a program executable by a processor for performing a method, wherein the processor is operatively connected to an optical sensor and an electromagnetic sensor, the method includes tracking, using the optical sensor, the object over a period of time including multiple time steps to produce, for each of the multiple time steps, a deformation of a nominal shape of the object, wherein the nominal shape of the object is a shape of the object arranged in a prototypical pose; acquiring, using the electromagnetic sensor, snapshots of the scene over the multiple time steps to produce a set of radar reflectivity image of the object with deformed shapes defined by the corresponding deformations of the nominal shape of the object, wherein at least two different radar reflectivity images include the object with different deformed shapes; determining, for each of the multiple time steps using the deformation determined for the corresponding time step, a transformation between the radar reflectivity image of the object acquired by the electromagnetic sensor at the corresponding time step and a radar reflectivity image of the object in the prototypical pose; and combining the radar reflectivity images of the object with deformed shapes transformed with the corresponding transformations to produce the radar reflectivity image of the object in the prototypical pose.

DETAILED DESCRIPTION

Figure 1:
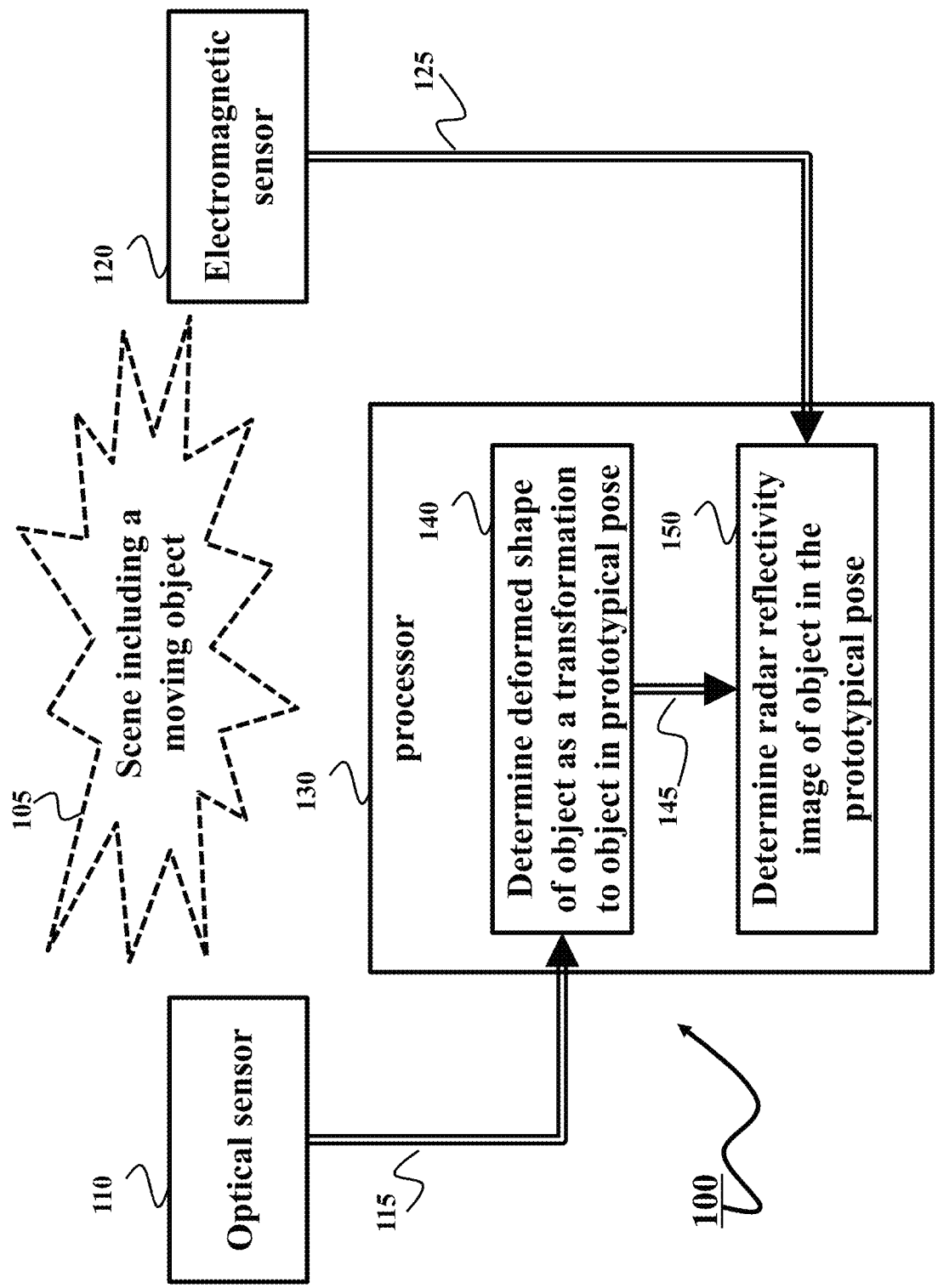
FIG. 1 shows a block diagram of a radar imaging system 100 to determine a radar reflectivity image of a scene 105 including an object moving with the scene according to some embodiments.

FIG. 1 shows a block diagram of a radar imaging system 100 to determine a radar reflectivity image of a scene 105 including an object moving with the scene according to some embodiments. The radar imaging system 100 includes at least one optical sensor 110 configured to acquire an optical reflectivity images of the scene and at least one electromagnetic sensor 120 configured to acquire a radar reflectivity images of the scene. Examples of the optical sensor 110 include one or combination of an optical camera, a depth camera, and an infrared camera. Examples of the electromagnetic sensor 120 include one or combination of a millimeter wave (mmWave) radar, a terahertz (Thz) imaging sensor, and a backscatter X-ray sensor.

The optical sensor 110 is configured to track the object in the scene over a period of time including multiple time steps to produce, for each of the multiple time steps, a shape of the object at a current time step. In various embodiments, the optical sensor 110 determines the shape of the object as a deformation 115 of a nominal shape of the object. For example, the nominal shape of the object is a shape of the object arranged in a prototypical pose typically known in advance.

The electromagnetic sensor 120 is configured to acquire snapshots of the scene over the multiple time steps to produce a set of radar reflectivity images 125 of the object with deformed shapes defined by the corresponding deformations of the nominal shape of the object determined by the optical sensor. Notably, due to the movement of the object in the scene, at least two different radar reflectivity images include the object with different deformed shapes.

The radar imaging system 100 includes at least one processor 130. The processor 130 is configured to determine 140, for each of the multiple time steps using the deformation 115 determined for the corresponding time step, a transformation 145 between the radar reflectivity image of the object acquired by the electromagnetic sensor at the corresponding time step and a radar reflectivity image of the object in the prototypical pose. Notably, because the object is moving in the scene, different radar reflectivity images can have different transformations. In one embodiment, the optical and the radar reflectivity images are synchronized, e.g., taken concurrently at corresponding time steps and/or with a predetermined time shift, such that the transformation of a radar reflectivity image is determined using the deformation produce by the corresponding optical reflectivity image synchronized or acquired at the same time step.

Some embodiments are based on recognition that a radar imaging system can jointly use the measurements of a scene acquired over multiple time steps. Such a system of measurements can be used to improve the resolution of the radar reflectivity image beyond a resolution governed by the size of the antennas of the radar imaging system. When the object is moving or deforming over time, at different time steps, the object can be located at different position and can have a different shape caused by the non-rigid motion. Such a dislocation and deformation of the object make the system of measurements ambiguous, i.e., ill-posed, and difficult or impractical to solve. However, the embodiments can, instead, exploit the diversity introduced by the motion by determining and using the transformations between each radar reflectivity image and the common image, i.e., the radar reflectivity image of the object in the prototypical pose. Thus, the embodiments can to jointly use measurements of a scene acquired over multiple time steps to produce the radar reflectivity image of the object in the prototypical pose.

To that end, the processor 130 is configured to combine 150 the radar reflectivity images of the object with deformed shapes transformed with the corresponding transformation to produce the radar reflectivity image of the object in the prototypical pose. For example, the combination determines the radar reflectivity image of the object in the prototypical pose such that in each snapshot, the prototypical radar reflectivity image transformed with the corresponding transformation matches each of the radar reflectivity images of the object.

Some embodiments are based on recognition that one of the reason preventing electromagnetic sensors of a radar imaging system to track a moving object is a resolution of the electromagnetic sensing governed by a physical size of the antennas of the sensors. Specifically, for the practical reasons, the size of the antennas of the radar imaging system can allow to estimate only coarse image of the object at each time step. Such a coarse image can be suitable to track an object subject to rigid and finite transformation, but can fail to recognize arbitrarily non-rigid transformation typical for the motion of a human.

Some embodiments are based on recognition that optical sensors, such as monochrome or color or infrared video cameras, or depth cameras or a combination thereof, are cheaper than electromagnetic sensor with comparable resolution. Hence, an optical sensor can be used for tracking the motion of the target, even if the target is deformable and the motion is not rigid. Further, some embodiments are based on another recognition that in a number of applications where radar imaging of deformable objects is necessary and useful, the object is moving sufficiently close and visible to the radar imaging system such that optical sensors can provide sufficient accuracy for tracking.

Some embodiments are based on realization that for a number of applications, it is sufficient to determine a radar reflectivity image of an object at some prototypical pose, not necessarily at a current pose that object has at a current instance of time. For example, for some security applications, the prototypical pose of a person is standing, with the hands extended upwards or sideways. The object arranged in the prototypical pose has a nominal shape that can change, i.e., deform, as the object moves.

Some embodiments are based on another realization that the optical sensor can track the object in the scene in relative, rather than an absolute mode. For example, instead of determining a pose and/or an absolute current shape of the object in the current snapshot of the scene, the optical sensor can determine the relative shape of the object as a deformation a nominal shape of the object. The embodiments are based on realization the deformation of the nominal shape of the object determined by the optical sensor can be used to reconstruct radar reflectivity image of the object in the prototypical pose, e.g., having the prototypical shape.

Figure 2:
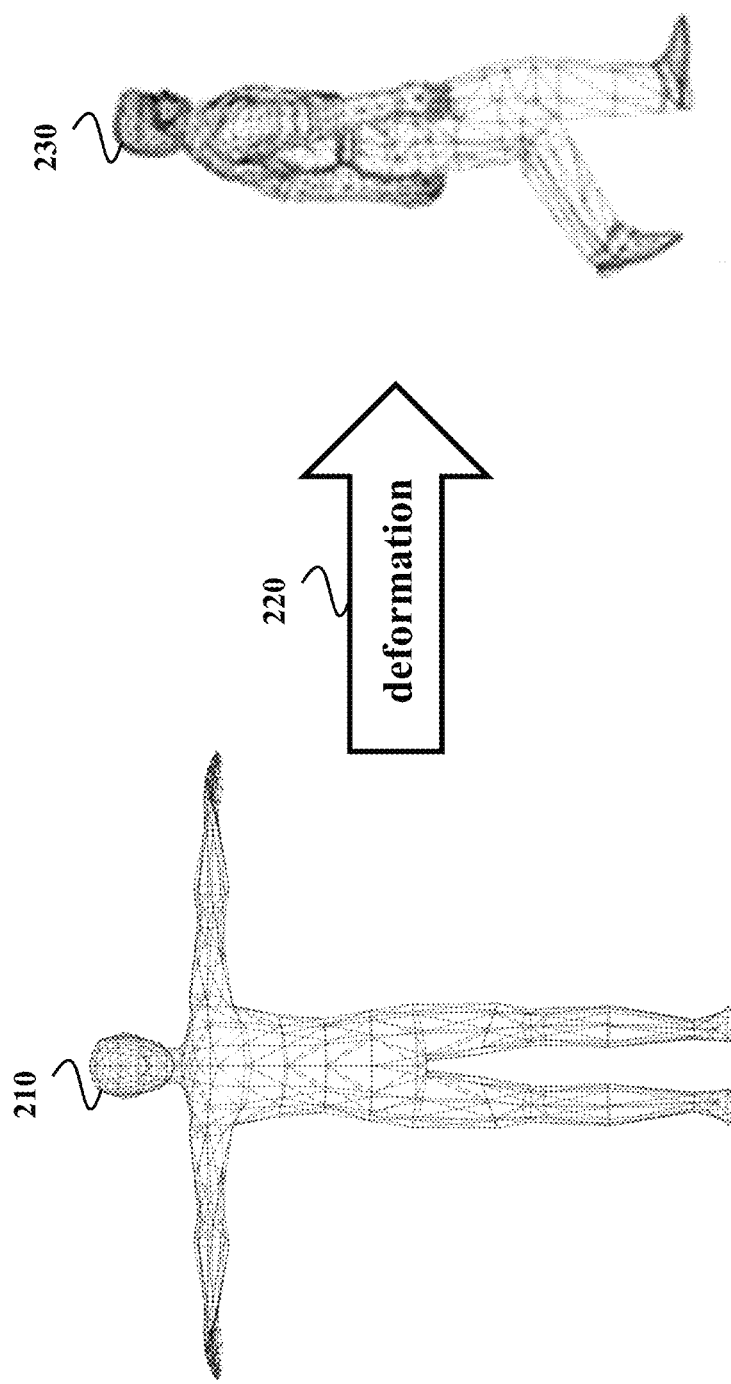
FIG. 2 shows a schematic of a relative tracking used by some embodiments using the optical sensor.

FIG. 2 shows a schematic of a relative tracking used by some embodiments using the optical sensor. The embodiments track a moving object, e.g., a person, by determining at each time instant a deformation 220 of a nominal shape 210 of the object resulting in the current deformed shape 230 of the object. Some embodiments are based on realization that the deformation 220 indicative of transformation of an object in an optical reflectivity image is also indicative of the transformation of the object in the radar reflectivity image. To that end, by aiding the radar reconstruction using the optical motion tracking, the radar imaging system according to some embodiments can be able to image very complex target objects that are moving.

Figure 3:
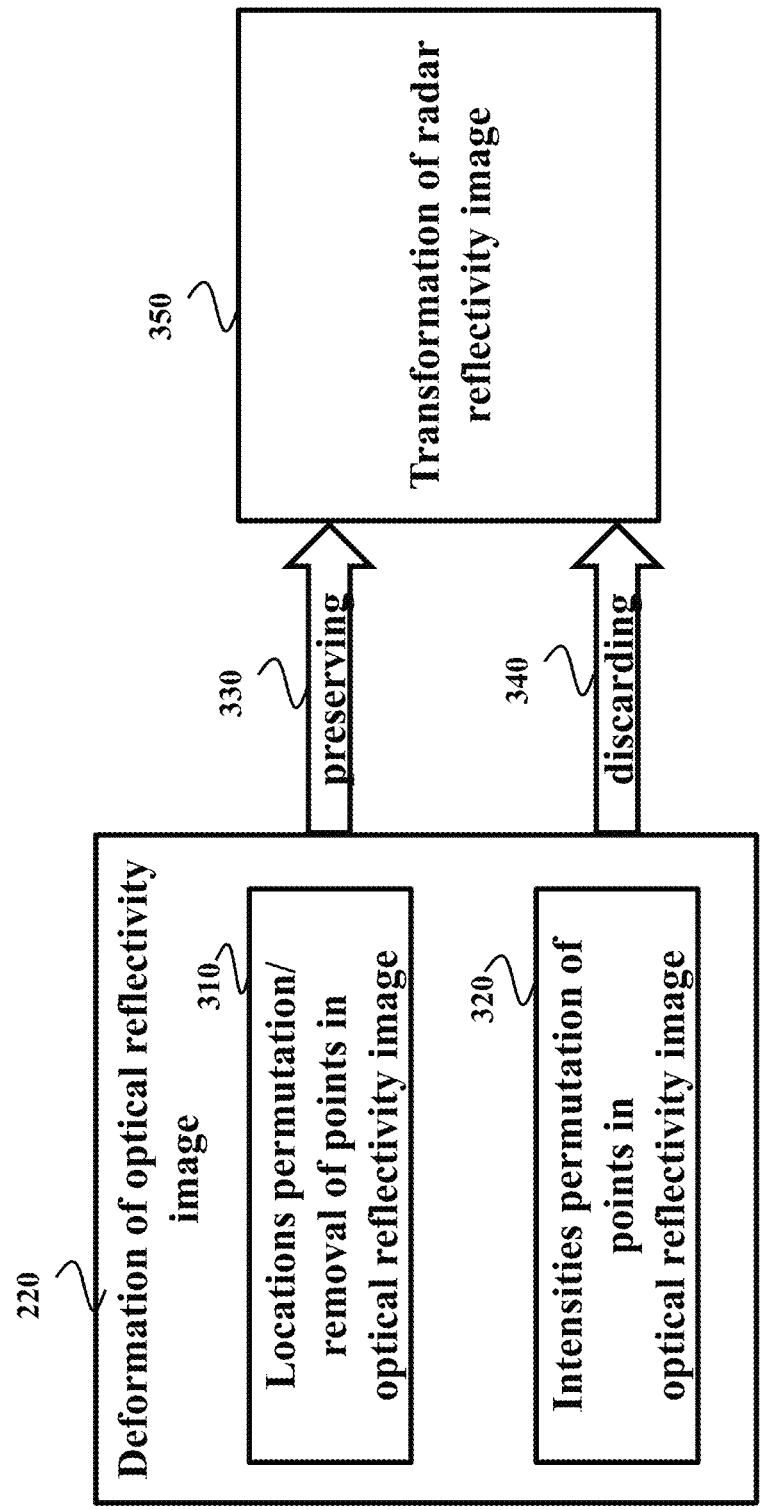
FIG. 3 shows a block diagram representing the relationship between transformation of a shape of an object in the optical reflectivity image and a transformation of the object in the radar reflectivity image used by some embodiment for radar reflectivity image reconstruction.

FIG. 3 shows a block diagram representing the relationship between transformation of a shape of an object in the optical reflectivity image and a transformation of the object in the radar reflectivity image used by some embodiment for radar reflectivity image reconstruction. For example, some embodiments use a realization that the deformation 220 can be seen as permutations of locations and/or intensities of the points of the optical reflectivity image of the object having the nominal shape. Specifically, the deformation 220 can be seen as a subsampled permutation 310 that permutes locations and/or removes different points of the optical reflectivity image of the object having the nominal shape. In addition, the deformation 220 can be seen as a permutation 320 of intensities of those permuted points.

Some embodiments are based on realization that the transformation 350 in the radar reflectivity image can be seen as a subsampled permutation that permutes and/or removes different points of the radar reflectivity image of the object in the prototypical pose in dependence of the deformation of the nominal shape of the object in the prototypical pose. To that end, the permutation 310 can be preserved 330 to arrive on the transformation 350.

On the other hand, for the purpose of radar image reconstruction, the reflectivity of each point in the radar reflectivity image does not change with the deformation of the object. Furthermore, the points of the radar reflectivity image correspond to points in a corresponding optical reflectivity image. Thus, a reflectivity of a different modality, such as an optical reflectivity, can capture the same motion and deformation of the object as the radar reflectivity. On the other hand, the intensity of the points in the radar reflectivity image are the same between snapshots and can be estimated from the measurements during reconstruction. Beyond its use in estimating the deformation of the object, the intensity of the optical reflectivity and its permutation may not be useful in determining the radar reflectivity image and may be discarded 340.

Figure 4:
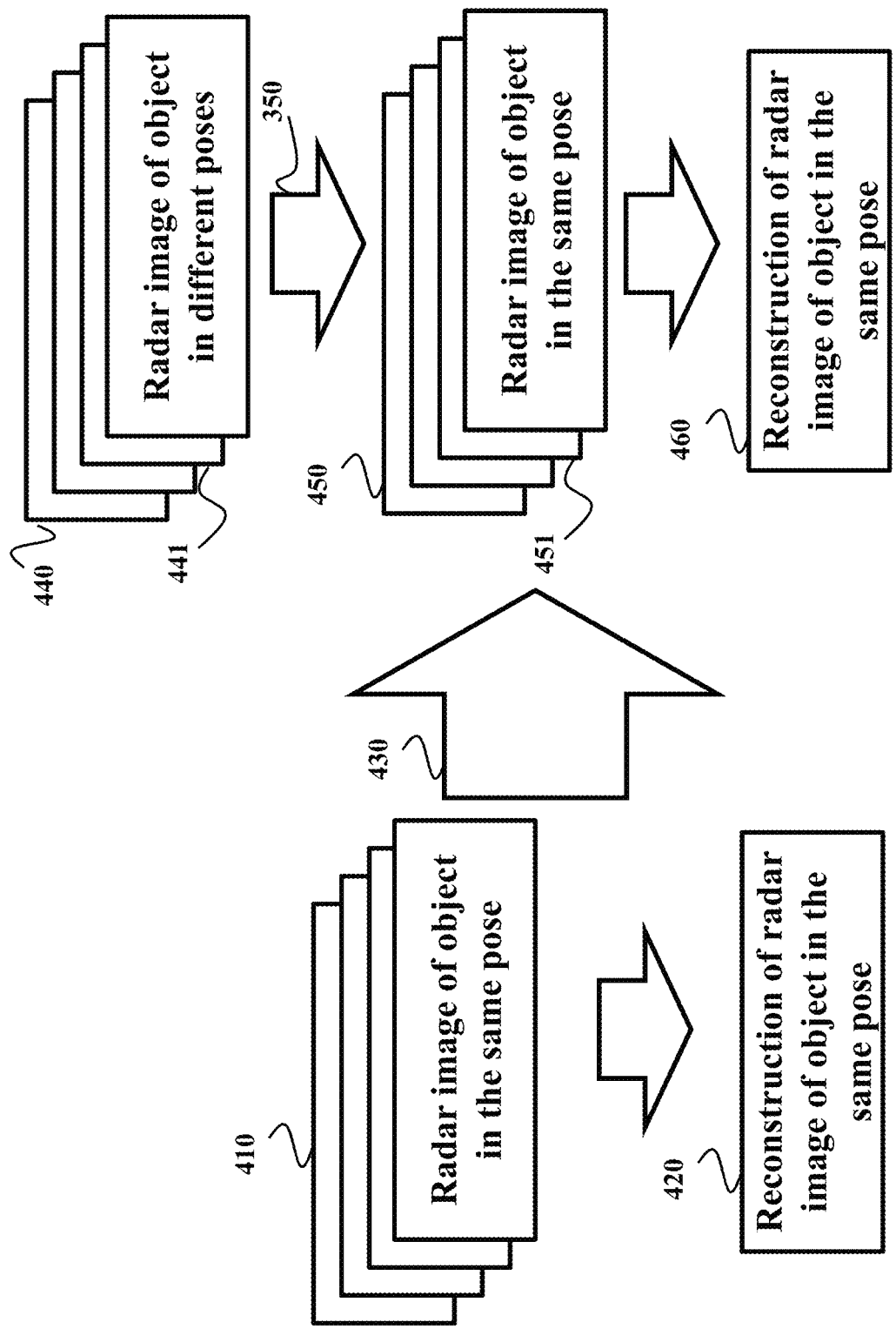
FIG. 4 shows a schematic of illustrating some principles employed by various embodiments for radar reflectivity image reconstruction.

FIG. 4 shows a schematic of illustrating some principles employed by various embodiments for radar reflectivity image reconstruction. Specifically, some embodiments are based on understanding that a set of radar reflectivity images 410 of an object in the same pose but different position can be used to reconstruct 420 the radar reflectivity image. Typically, the resolution of the images 410 is less than the resolution of the image 420. Such an approach allows reducing the cost of the electromagnetic sensors used to acquire the radar reflectivity images. Typically, in this situation, the object only exhibits translation and rotation relative to the radar over multiple time steps over which the radar reflectivity images 410 are acquired.

Some embodiments are based on realization that this approach can be modified for the situation when the object in the radar reflectivity images 440 deforms to different shapes, i.e., the object is non-rigid and moving in the scene. Specifically, the embodiments use the transformation 350 to transform the radar reflectivity images 440 with the objects having different shapes into the radar reflectivity images 450 with the objects having the same shape, i.e., a nominal shape of an object in a prototypical pose. Those radar reflectivity images 450 can be reconstructed to produce the reconstructed radar reflectivity image 460 of the object in the prototypical pose. As before, the image 460 can have a higher resolution than the resolution of the images 440.

For example, one embodiment selects the nominal shape of the object arranged in the prototypical pose as a shape of the object in one of the images 440, e.g., an image 441. In such a manner, the transformation 350 between the radar reflectivity image 441 of the object having the selected shape and corresponding image 451 of the object in the prototypical pose is an identity transformation. Additionally or alternatively, in one embodiment, the information indicative of the nominal shape of the object arranged in the prototypical pose is received, e.g., via an input interface.

Some embodiments are based on realization that the representation of the same object can be defined in two distinct discretization grids, i.e., frames of reference and coordinate/indexing systems in imaging the object. The first grid is the discretization on the object itself, typically, but not necessarily, defined on a prototypical pose of the object. For example, a typical prototypical pose for a human is standing, with the hands extended sideways. The grid indexes points on the human and deforms as the human moves. However, the points do not move relative to the human anatomy. E.g., the point at the tip of the thumb always has the same index, no matter where the thumb might be positioned relatively to the rest of the body. The second grid is the discretization of the space in front of the radar sensor. This grid is typically radial or Cartesian (i.e., rectangular) and is fixed relative to the sensor.

As the target moves in front of the radar, the first grid deforms—since it always conforms to the shape of the target—and occupies different positions on the second grid. In other words, in some embodiments, the map of the points of the first grid to points on the second grid is a subsampled permutation, corresponding to the first grid deformation, which can be obtained from the tracking algorithm and the optical sensor(s) used for motion tracking. More generally, the map of the representation from the first grid to the second grid is a liner operator that is obtained by the tracking algorithm and the optical sensors, in combination with the radar properties. In some embodiments, if not a subsampled permutation, this map may be a blurred or filtered subsampled permutation, or a blurred or filtered subsampled rearranging of coordinates in a continuous space, that is subsequently discretized, thus allowing for points moving in-between grid locations.

This dual-grid representation of an object allows to streamline the relationship between the optical and radar reflectivity images to reduce the computational cost of the radar reflectivity image reconstruction. Using knowledge of this deformation, and multiple snapshots it is possible to reconstruct the target image using techniques similar to ISAR, but sufficiently modified to take the deformation into account. This modification is challenging and requires newly developed solver, in order to account for possible occlusions and/or tracking error.

Figure 5:
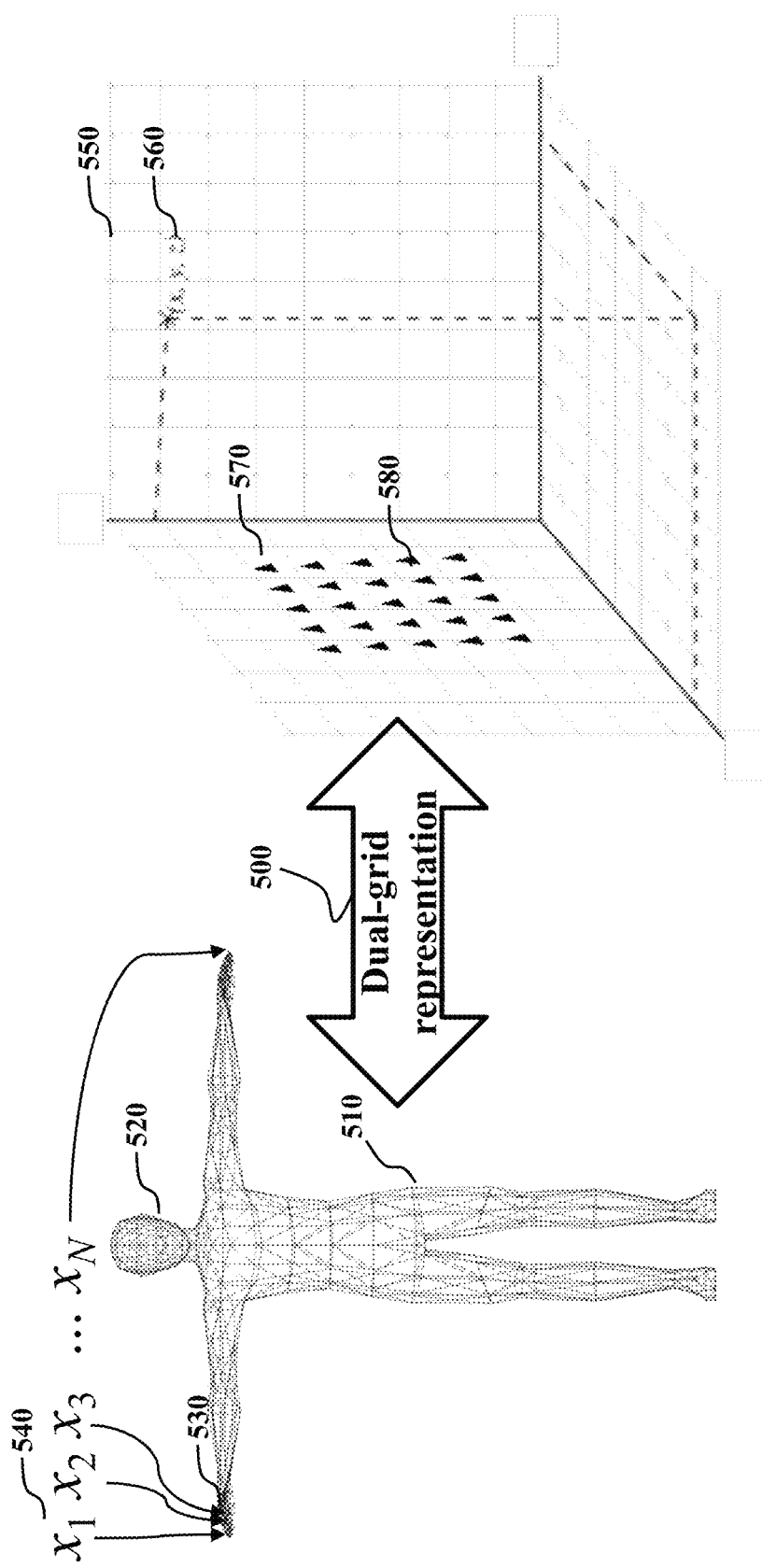
FIG. 5 shows a schematic of dual-grid representation 500 of an object according to some embodiments.

FIG. 5 shows a schematic of dual-grid representation 500 of an object according to some embodiments. For example, a deformable object 510, a human in this example, is in a prototypical pose. To construct a radar reflectivity image in the prototypical form, a grid 520 can be defined on the prototypical pose of the object. In other words, the first grid 520 of the dual-grid representation is a prototypical grid that discretizes the object itself. For example, the grid in the image has grid positions 530 indexed as 1, 2, . . . , N. The radar reflectivity of each point in the grid 540 is denoted as $x_1, x_2, \ldots, x_N$. There are several ways to index the prototypical grid, but in general they can always be mapped to a sequential grid, as shown in the figure. Any grid indexing approach can be used in embodiments of the invention.

The second grid of the dual-grid representation is a radar grid that discretizes the scene itself. For example, in one embodiments the second grid is a rectangular (Cartesian) grid 550. However, other grids, such as a radial one are also be used by different embodiments. As with the prototypical grid, there are several ways to index the radar grid used by different embodiments. For example, in the embodiment shown in FIG. 5, the radar grid is indexed using Cartesian coordinates 560. The electromagnetic sensor, i.e., radar 570, and/or individual radar transceivers 580 have positions inside the radar grid, at known locations.

Figure 6:
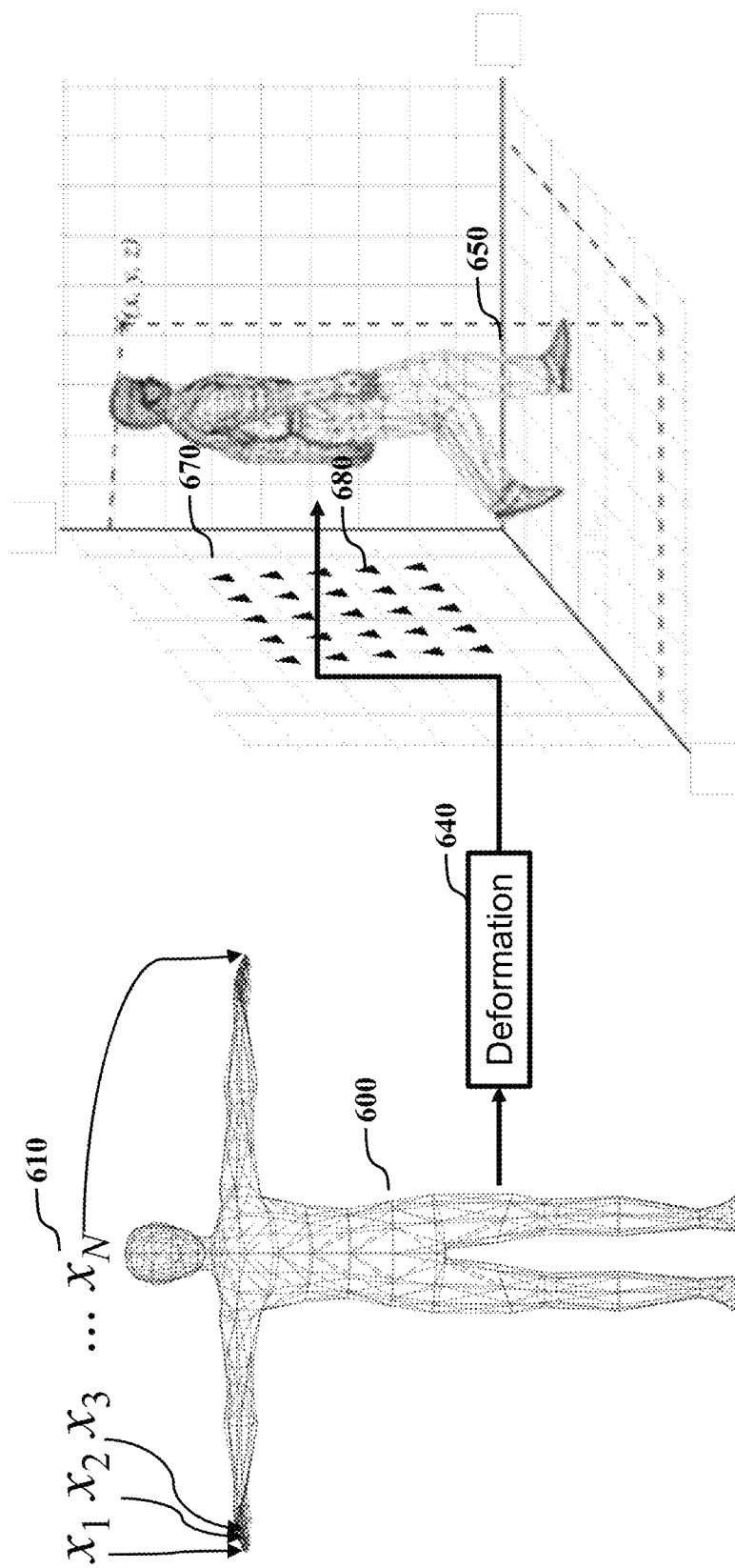
FIG. 6 shows a schematic capturing the motion of the object using the dual-grid representation according to one embodiment.

FIG. 6 shows a schematic capturing the motion of the object using the dual-grid representation according to one embodiment. FIG. 6 illustrates the object in the prototypical pose 600, as well as the object's pose in front of the radar at a single snapshot 650. The object's pose in front of the radar can be described by a deformation 640 of the first grid to represent the deformation of the object in the second grid. The reflectivity of the object in the radar grid is observed by the radar 670 and its individual transceivers 680 according to a radar forward operator related to the hardware of the radar.

As described above, the deformation of the radar grid can be inferred by the optical sensor, since the transformation of the object is the same both in the radar and the optical modalities. Thus, the optical sensor can observe the optical image deformation, and infer the deformation of the prototypical grid to the radar grid.

Figure 7:
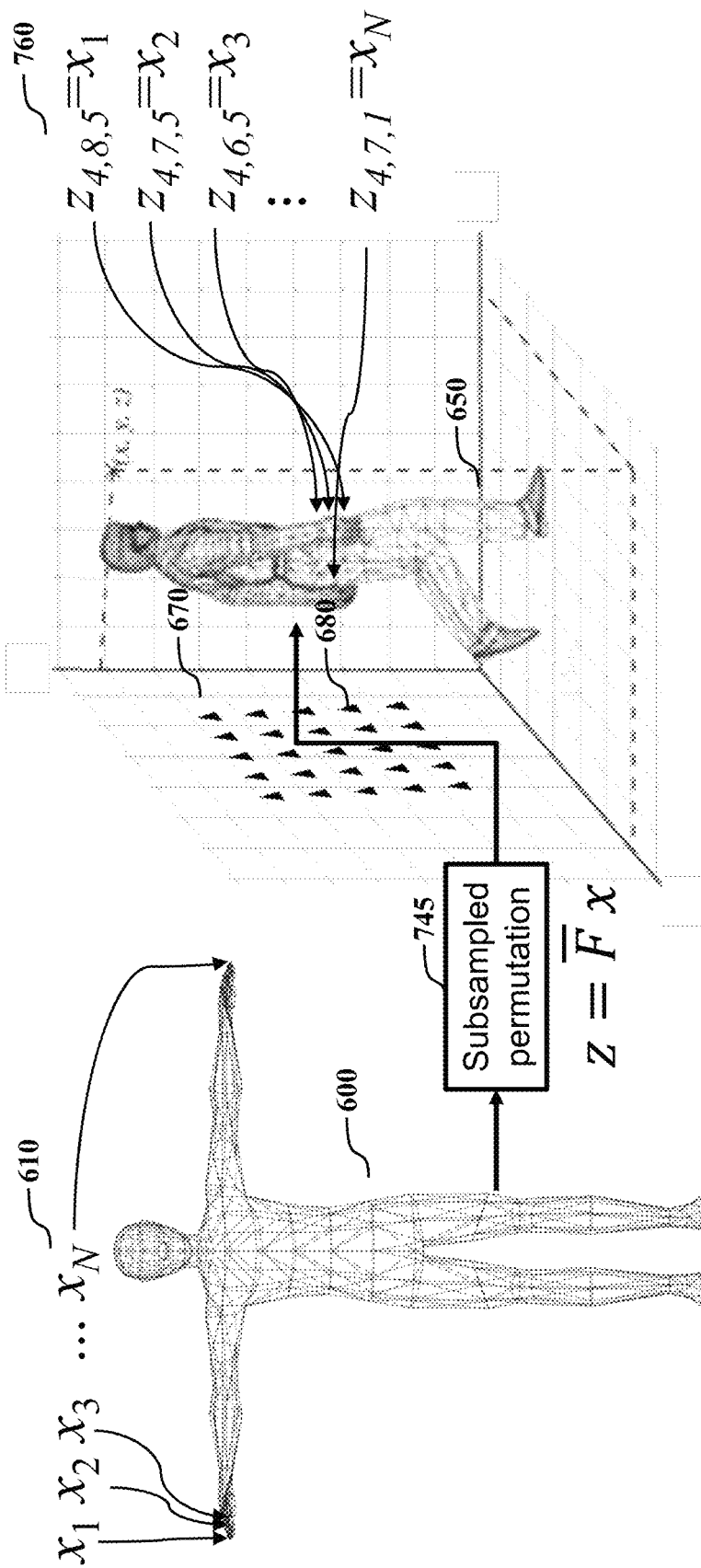
FIG. 7 shows a schematic capturing the transformation of the object caused by its motion using the dual-grid representation according to one embodiment.

FIG. 7 shows a schematic capturing the transformation of the object caused by its motion using the dual-grid representation according to one embodiment. This embodiment determines each transformation as a subsampled permutation that permutes locations of some points of the radar reflectivity image of the object in the prototypical pose and removes different points of the radar reflectivity image of the object in the prototypical pose in dependence of the deformation of the nominal shape of the object in the prototypical pose.

Specifically, the deformation is a subsampled coordinate permutation 745, i.e., a transformation that maps the indices in the coordinate system of the prototypical grid to the indices of the radar grid. Thus, the reflectivity of the object observed by the radar is a simple permutation with erasures that maps 760 the reflectivity of the object in the prototypical grid 610 to the reflectivity of the object in the radar grid, consistent with the object's pose.

More generally, in some embodiments, the reflectivity image of the deformed object in the radar grid is a linear transformation of the reflectivity image of the object in the prototypical pose, that can be described as $$z=\overline{F}x, \qquad (1)$$

where x is the radar reflectivity image of the object in the prototypical pose and z is the radar reflectivity image of the deformed object in the radar grid.

Figure 8:
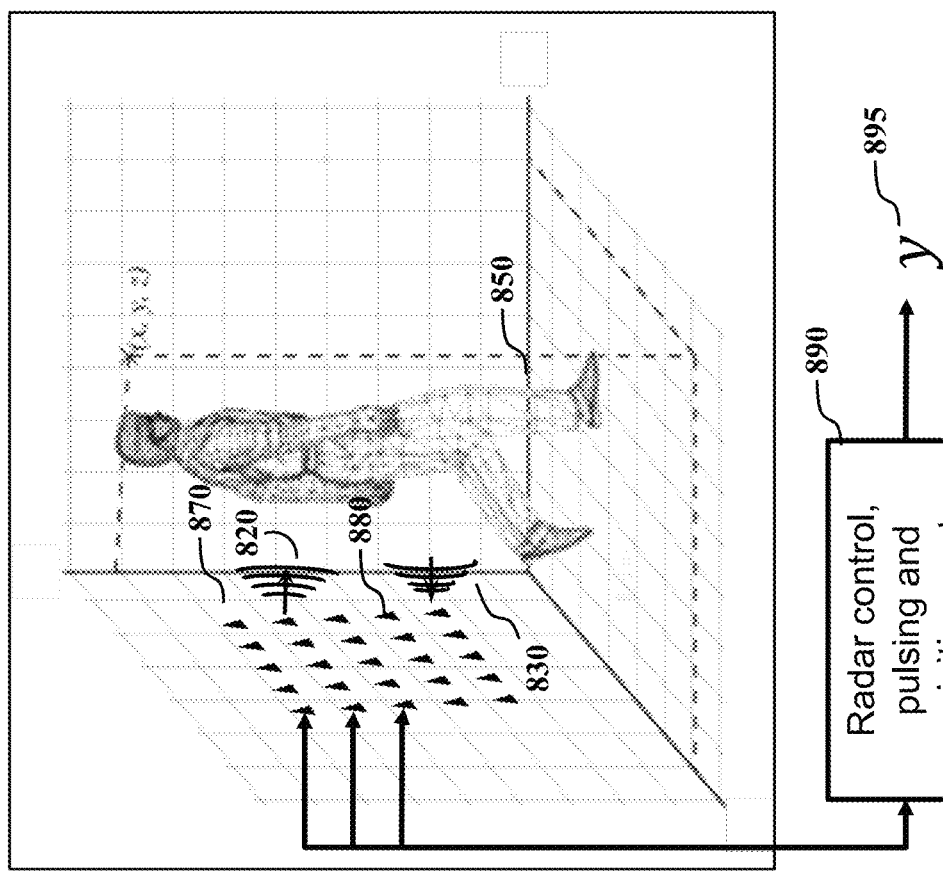
FIG. 8 shows a schematic of an electromagnetic sensor, such as a radar, acquiring the radar reflectivity image according to some embodiments.

FIG. 8 shows a schematic of an electromagnetic sensor, such as a radar, acquiring the radar reflectivity image according to some embodiments. The radar 870 includes transceivers 880 (or separate transmitters and receivers) which are used to sense the scene. In particular, one or more of the transceivers transmit a pulse 820 to the scene. The pulses are absorbed by or reflect of the object 850, according to the reflectivity of the object. The reflected pulses 830 are acquired by one or more transceivers 880. The pulse transmission and acquisition, is controlled by a radar control, pulsing and acquisition system 890, which may control the pulse shape and timing, as well as which transceivers transmit and which receive.

The system is also configured for acquiring the signals that the transceivers produce in response to the received pulses. The system outputs data y 895 which represent recordings of the pulse reflections. These recordings are samples of the reflections or a function of them, such as demodulation, filtering, de-chirping, or other pre-processing functions known in the art.

The acquired data y are linear measurements of z, the radar reflectivity image of the deformed object 850 in the radar scene, through the radar acquisition function, also known in the art as the forward operator denoted here using A. Thus, the acquired data for a single snapshot are equal to $$y=Az=A\overline{F}x. \qquad (2)$$

If the radar system has a sufficient number of sensors and a big aperture, then the data y may be sufficient to recover z, the radar reflectivity image of the object in the deformed pose. However, recovering the image in high resolution would require a large and expensive radar array. Furthermore, in particular deformations, parts of the object might not be visible to the array, which can make their radar reflectivity not recoverable, irrespective of the radar array size.

For that reason, a radar imaging system of some embodiments acquire several snapshots of the radar image, under different deformations $$y_i = Az_i = A\overline{F}_i x, \quad (3)$$

where $i=1, \ldots, T$ is the index of the snapshot, and T is the total number of snapshots. In various embodiments, the only change between snapshots is the deformation of the object, and, therefore, the deformation $\overline{F}_i$ of the radar reflectivity image. In some embodiments, the radar forward operator can be different when, for example, different transducers are used to acquire each snapshot. This is accommodated in the above model by modifying (3) to include a snapshot-dependent forward operator:

$$y_i = A_i z_i = A_i \overline{F}_i x. \quad (4)$$

It is evident that (4) describes (3) when $A = A_i$ for all i.

Some embodiments reconstruct the radar reflectivity image of the object in the prototypical pose by combining the radar reflectivity images of the object with deformed shapes transformed with the corresponding transformations. For example, using multiple snapshots, the reconstruction problem becomes one of recovering x from $$\begin{bmatrix} y_1 \\ \vdots \\ y_T \end{bmatrix} = \begin{bmatrix} A_1 \overline{F}_1 \\ \vdots \\ A_T \overline{F}_T \end{bmatrix} x, \quad (5)$$

which, assuming the $\overline{F}_i$ are known, can be performed using, e.g., least squares inversion. Some embodiments also impose additional regularization constraints on reconstructing image x, such as sparsity or smoothness, by expressing x in some lower-dimensional basis of a subspace or a large dictionary, i.e, $x = Bh$, where B is a low dimensional basis or a dictionary, and h is a set of coefficients either lower-dimensional than x or sparse. Alternatively, or additionally, some embodiments impose low total variation structure on x, i.e., sparsity in its gradient. All these regularization constraints can be imposed by regularizing using different techniques.

Some embodiments determine the transformation $\overline{F}_i$ of the radar reflectivity image from the deformation of an image acquired in a different modality, such as an optical image. In other words, by using a higher resolution modality it is possible to infer the physical deformation of the object. Since the reflectivity of each point in the object's radar reflectivity image does not change with the position of the point, i.e., with the deformation of the object, the deformation inferred by the sensor of the different modality can be used to infer the deformation of the object's radar reflectivity.

Optical sensors, such as monochrome, color, or infrared cameras record snapshots of the reflectivity of objects as they move through a scene. Using two or more of these cameras, placed at some distance apart, it is possible to determine the distance of each point of the object from each camera, known in the art as depth of the point. Similarly, depth cameras use the time-of-flight of optical pulses or structured light patterns to determine depth. By acquiring the optical reflectivity and/or the depth of the object as it moves, there are techniques in the art to track the points of the object, i.e., to determine, in each snapshot, the deformation of the objects from the deformation of the optical or the depth image. Determining this deformation is possible in the art, even though the optical reflection of the object changes with deformation due to lighting, occlusion, shadowing and other effects.

Thus, an optical sensor, such as a camera or a depth sensor, can be used to infer the deformation $\overline{F}_i$ in each snapshot. The optical sensor acquires a snapshot of the object at the same time instance as the radar sensor acquires a snapshot of the radar reflectivity image, as described in (4). This radar reflectivity image can then be used to track the deformation of the object in order to reconstruct its radar reflectivity image. In some embodiments, the optical sensor might acquire snapshots at different time instances than the radar sensor. The deformation of the object at the time instance that the radar acquires the snapshot is can then be inferred using multiple optical snapshots, using techniques known in the art, such as interpolation or motion modeling.

Figure 9:
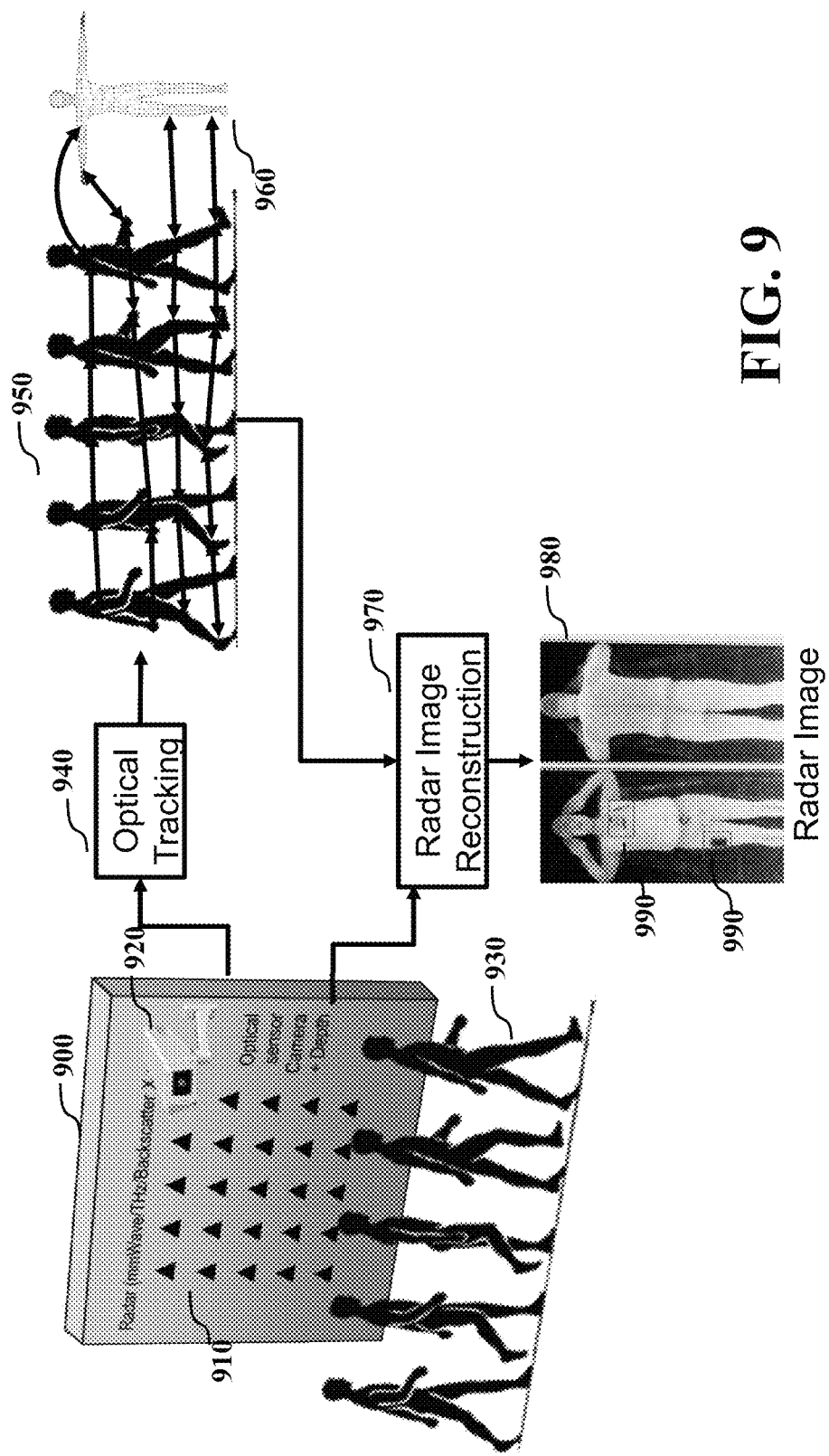
FIG. 9 shows a schematic of reconstruction of a radar reflectivity image according to one embodiment.

FIG. 9 shows a schematic of reconstruction of a radar reflectivity image according to one embodiment. In this embodiment, the radar imaging system includes one or more electromagnetic sensors, such as radar arrays 910, and one or more optical sensors 920. The object 930, for example a human, moves and deforms in front of the radar and the optical sensors, while the sensors acquire snapshots. The data acquired by the optical sensor are processed by an optical tracking system 940, which produces a tracking of the object and its deformation 950 from snapshot to snapshot. The optical tracking system 940 also maps the optical deformation to the object's prototypical pose, i.e., determines the mapping $\overline{F}_i$ for each snapshot. This mapping is used together with the data acquired in each radar snapshot to reconstruct 970 the radar reflectivity image of the object 980. The reconstructed radar reflectivity image may be represented in the prototypical pose by the system, by may be converted and represented in any pose and with any modifications suitable to the system or its user, for example to highlight parts of the image for further examination 990.

In such a manner, the radar imaging system includes an optical tracking system including the optical sensor to produce each deformation to include an optical transformation between points of an optical reflectivity image including the object in the deformed shape and points of a prototypical optical reflectivity image including the object in the nominal shape. The processor of the radar imaging system determines the transformation as a function of the optical transformation.

Figure 10:
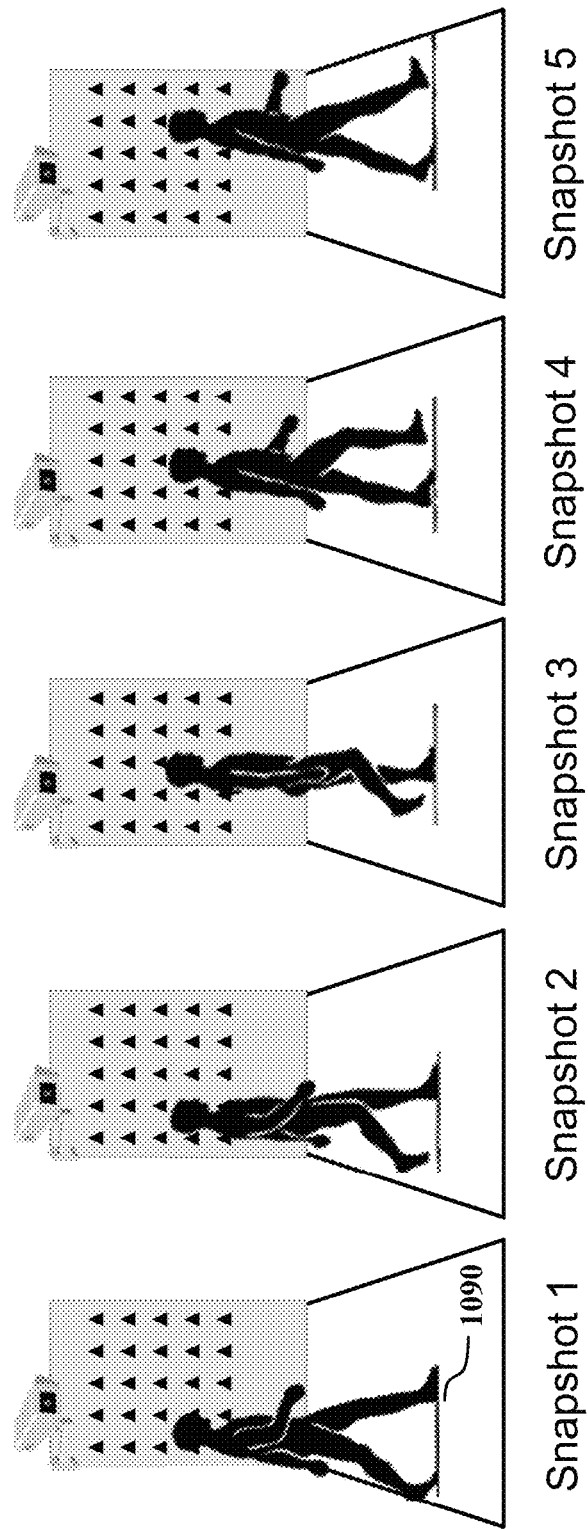
FIG. 10 shows an example of the motion and deformation of the object in front of the optical and radar sensors at each snapshot used by some embodiments.

FIG. 10 shows an example of the motion and deformation of the object in front of the optical and radar sensors at each snapshot used by some embodiments. In this example, a human 1090 walks in front of the sensors. The sensors obtain snapshots at different time instances, with the object in different pose. For example, in FIG. 10, at each snapshot, the human is at a different position in front of the sensors, walking from left to right, and at a different pose, depending on the timing of each snapshot relative to the stride of the human.

Figure 11:
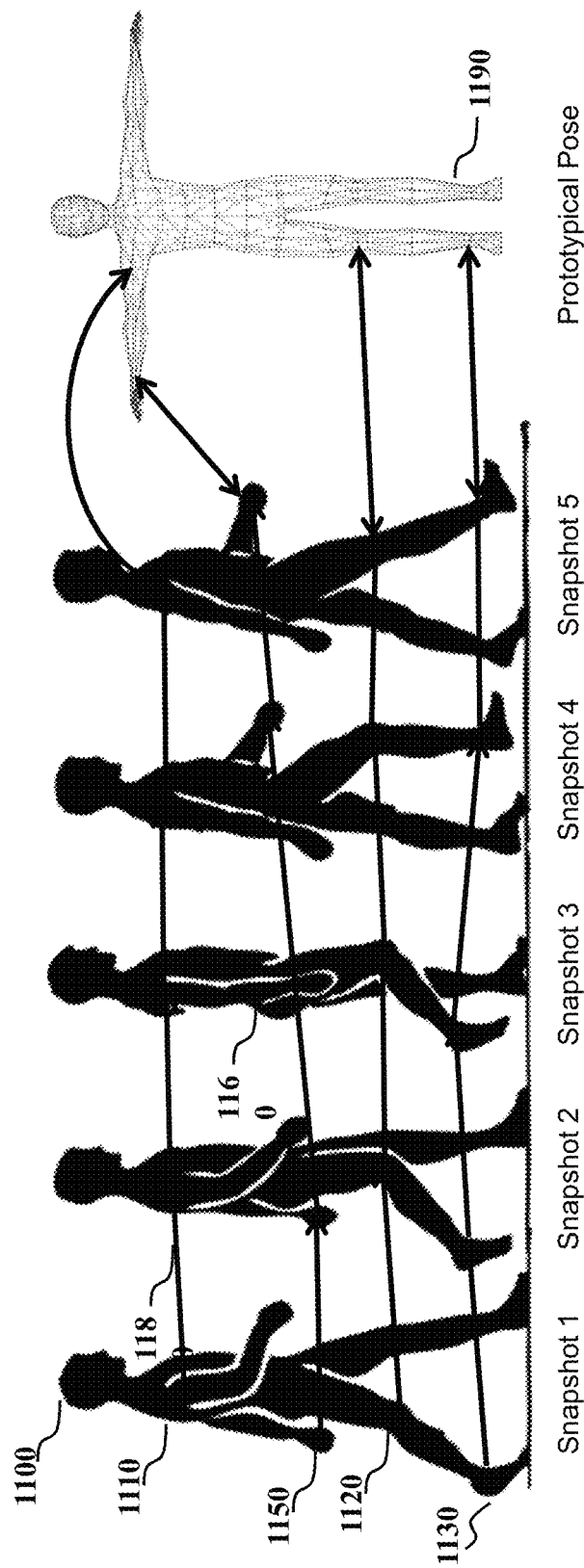
FIG. 11 shows a schematic of the tracking performed by the optical sensor using the example of FIG. 10.

FIG. 11 shows a schematic of the tracking performed by the optical sensor using the example of FIG. 10. Notably, there is a snapshot based one-to-one correspondence between the deformation of the shape of the object in the optical reflectivity image and corresponding transformation of the radar reflectivity image.

Each point on the human 1100 is tracked by the camera at each time instant, and then mapped to the corresponding point in the prototypical pose 1190. Each point might or might not be visible in some snapshots. For example, points on the right shoulder 1110, right knee 1120, or right ankle 1130 might always be visible, while points on the left hand 1150 might be occluded when the hand in behind the body and not visible to the sensors 1160. The tracking creates correspondences 1180 between points in different snapshots and the corresponding point in the prototypical image. The correspondences are used to generate $F_i$. If a point is not visible to the sensor at some particular snapshot, e.g., 1160, the $\overline{F}_i$ does not map this point to the radar grid, i.e., the corresponding column of the operator contains all zeros. In that sense, $\overline{F}_i$ subsamples the prototypical radar image to only map the points that are visible in the particular snapshot, as determined by the optical sensor.

Figure 12:
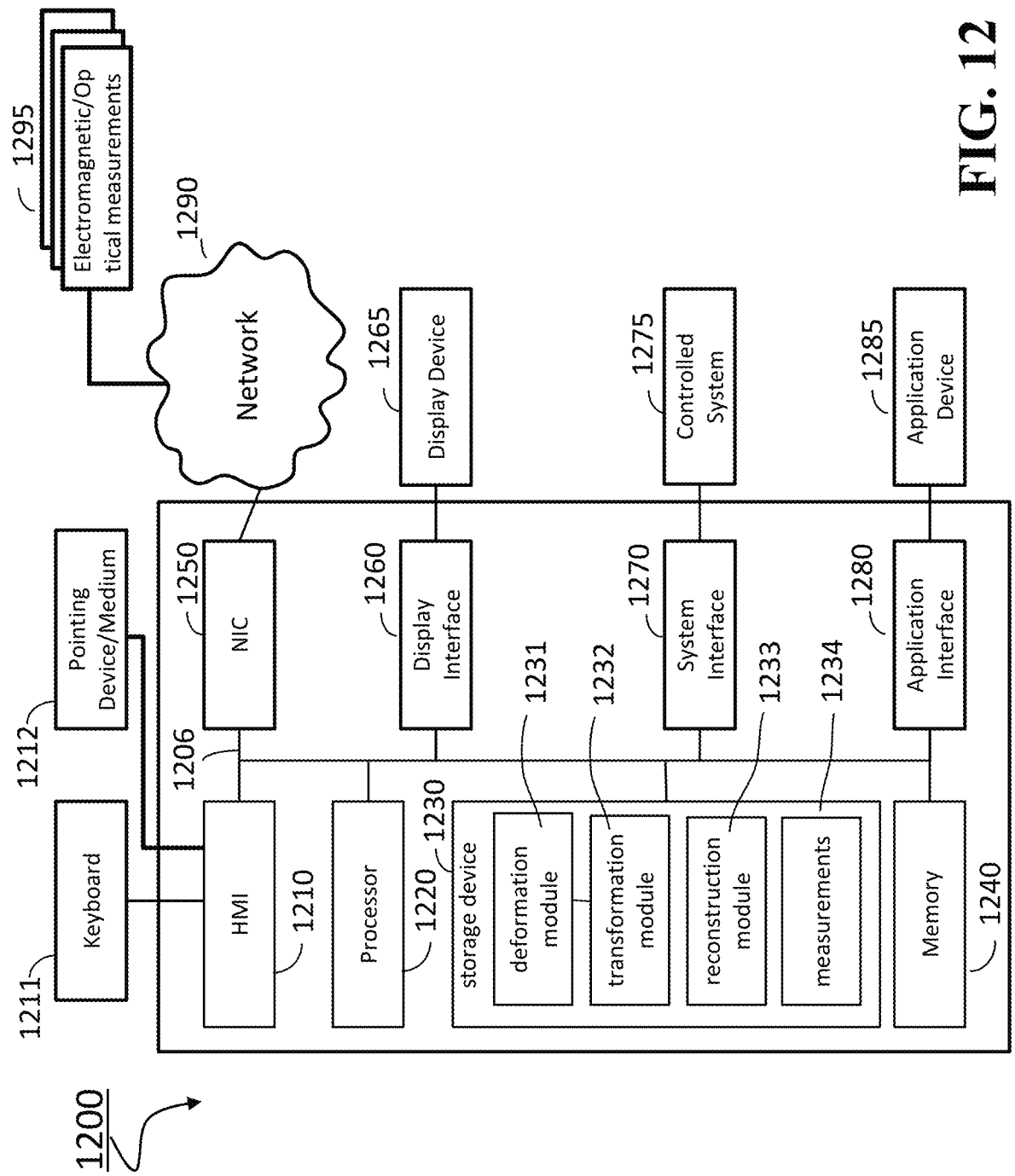
FIG. 12 shows a hardware diagram of different components of the radar imaging system 1200 in accordance with some embodiments.

FIG. 12 shows a hardware diagram of different components of the radar imaging system 1200 in accordance with some embodiments. The radar imaging system 1200 includes a processor 1220 configured to execute stored instructions, as well as a memory 1240 that stores instructions that are executable by the processor. The processor 1220 can be a single core processor, a multi-core processor, a computing cluster, or any number of other configurations. The memory 1240 can include random access memory (RAM), read only memory (ROM), flash memory, or any other suitable memory systems. The processor 1220 is connected through a bus 1206 to one or more input and output devices.

These instructions implement a method for reconstructing radar reflectivity image of the object in the prototypical pose. To that end, the radar imaging system 1200 can also include a storage device 1230 adapted to store different modules storing executable instructions for the processor 1220. The storage device stores a deformation module 1231 configured to estimate the deformation of the object in each snapshot using measurements 1234 of the optical sensor data, a transformation module 1232 configured to obtain the transformations of the radar reflectivity images which is an estimate of $\overline{F}_i$ the optical deformation; and reconstruction module 1233 configured to solve for x in Equation (4) above using the estimate $F_i$, in place of the true $\overline{F}_i$, and optionally applying regularization, as described above. The storage device 1230 can be implemented using a hard drive, an optical drive, a thumb drive, an array of drives, or any combinations thereof.

The radar imaging system 1200 includes an input interface to receive measurements 1295 of the optical and electromagnetic sensors. For example, in some implementations, the input interface includes a human machine interface 1210 within the radar imaging system 1200 that connects the processor 1220 to a keyboard 1211 and pointing device 1212, wherein the pointing device 1212 can include a mouse, trackball, touchpad, joy stick, pointing stick, stylus, or touchscreen, among others.

Additionally or alternatively, the input interface can include a network interface controller 1250 adapted to connect the radar imaging system 1200 through the bus 1206 to a network 1290. Through the network 1290, the measurements 1295 can be downloaded and stored within the storage system 1230 as training and/or operating data 1234 for storage and/or further processing.

The radar imaging system 1200 includes an output interface to render the prototypical radar reflectivity image of the object in the prototypical pose. For example, the radar imaging system 1200 can be linked through the bus 1206 to a display interface 1260 adapted to connect the radar imaging system 1200 to a display device 1265, wherein the display device 1265 can include a computer monitor, camera, television, projector, or mobile device, among others.

For example, the radar imaging system 1200 can be connected to a system interface 1270 adapted to connect the radar imaging system to a different system 1275 controlled based on the reconstructed radar reflectivity image. Additionally or alternatively, the radar imaging system 1200 can be connected to an application interface 1280 through the bus 1206 adapted to connect the radar imaging system 1200 to an application device 1285 that can operate based on results of image reconstruction.

Some embodiments are based on recognition that in some cases, the estimate $F_i$ of $\overline{F}_i$ contains errors. The errors can be modeled as $\overline{F}_i = E_i F_i$, where $E_i$ has similar structure as $F_i$, but is more constrained. In other words, $E_i$ is also a subsampled permutation or a more general operator which allows, e.g., blurring. However, because $E_i$ models the errors in the motion tracking, and the motion tracking is in general correct, the mapping that $E_i$ performs is only allowed to displace points a little bit away from the position the estimate $F_i$ placed them in. In summary, $F_i$, which is computed from the motion tracking part of the system, places the target grid in approximately the right position, and $E_i$ makes small corrections to this placement.

To that end, in some embodiments, the processor adjusts each transformation with a local error correction and determines concurrently the radar image of the object in the prototypical pose and each local error correction. For example, the processor determines concurrently the radar image of the object in the prototypical pose and each local error correction using one or combination of alternating minimization, projections, and constrained regularization.

Those embodiments are based on recognition that the motion tracking error $E_i$ is generally unknown. Otherwise, if the error is known, it would have been trivial to correct the motion error. Thus, the radar imaging system also estimates $E_i$ from the snapshots, in order to correct the error. In other words, in some embodiments, the processor of the radar imaging system is configured to solve $$\begin{bmatrix} y_1 \\ \vdots \\ y_T \end{bmatrix} = \begin{bmatrix} A_1 E_1 F_1 \\ \vdots \\ A_T E_T F_T \end{bmatrix} x, \tag{6}$$

where all the $E_i$ are unknown, in addition to x.

Various embodiments use different methods to recover the error, such as alternating minimization, or lifting to a higher space, by estimating the outer product of the $E_i$ and x, and imposing low-rank structure on the resulting object. Note that the restricted structure of $E_i$ can be imposed using constraints and/or regularization.

As above, assuming the radar has obtained sufficient snapshots, the estimate can be computed, and x be recovered. To that end, the processor solves for x and the $E_i$ in (6) above using the estimate $F_i$ in place of the true $\overline{F}_i$, and applying constraints and regularization as necessary, and as described above. Whether the tracking system is assumed to perform errors, or not, i.e., whether we correct for the error or not, the overall system recovers x, which is the image of object of interest, indexed by the grid in the prototypical pose.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. A processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

What is claimed:

1. A radar imaging system to reconstruct a radar reflectivity image of a scene including an object moving with the scene, comprising:
   an optical sensor to track the object over a period of time including multiple time steps to produce, for each of the multiple time steps, a deformation of a nominal shape of the object, wherein the nominal shape of the object is a shape of the object arranged in a prototypical pose;
   at least one electromagnetic sensor to acquire snapshots of the scene over the multiple time steps to produce a set of radar reflectivity image of the object with deformed shapes defined by the corresponding deformations of the nominal shape of the object, wherein at least two different radar reflectivity images include the object with different deformed shapes; and
   a processor
      to determine, for each of the multiple time steps using the deformation determined for the corresponding time step, a transformation between the radar reflectivity image of the object acquired by the electromagnetic sensor at the corresponding time step and a radar reflectivity image of the object in the prototypical pose; and
      to combine the radar reflectivity images of the object with deformed shapes transformed with the corresponding transformations to produce the radar reflectivity image of the object in the prototypical pose.

2. The radar imaging system of claim 1, wherein the processor determines each transformation as a subsampled permutation that permutes locations of some points of the radar reflectivity image of the object in the prototypical pose and removes different points of the radar reflectivity image of the object in the prototypical pose in dependence of the deformation of the nominal shape of the object in the prototypical pose.

3. The radar imaging system of claim 2, wherein the transformation is the discretization of a blurred or filtered subsampled rearranging of coordinates in a continuous space.

4. The radar imaging system of claim 2, the subsampled permutation preserves intensities of the points in permuted locations.

5. The radar imaging system of claim 1, further comprising:
   a tracking system including the optical sensor to produce each deformation to include an optical transformation between points of an optical reflectivity image including the object in the deformed shape and points of a prototypical optical reflectivity image including the object in the nominal shape, wherein the processor determines the transformation as a function of the optical transformation.

6. The radar imaging system of claim 1, wherein the nominal shape of the object arranged in the prototypical pose is selected as a shape of the object in one of an optical or radar reflectivity image, such that the transformation between the radar image of the object having the selected shape and the radar reflectivity image of the object in the prototypical pose is an identity transformation.

7. The radar imaging system of claim 1, further comprising:
   an input interface to accept information indicative of selection of the nominal shape of the object arranged in the prototypical pose; and
   an output interface to render the radar reflectivity image of the object in a selected pose, including the prototypical pose.

8. The radar imaging system of claim 1, wherein the processor determines the radar reflectivity image of the object in the prototypical pose that, when transformed by the transformation determined for each time step and acquired by the radar acquisition function, is consistent with the measurements at all of the multiple time steps.

9. The radar system of claim 8, wherein, for the determining the radar reflectivity image of the object in the prototypical pose, the processor regularizes using one or combination of sparsity in basis or dictionary, smoothness under a basis or dictionary transformation, and a total variation of the reflectivity image.

10. The radar imaging system of claim 1, wherein the processor adjusts each transformation with a local error correction and determines concurrently the radar image of the object in the prototypical pose and each local error correction.

11. The radar imaging system of claim 10, wherein the processor determines concurrently the radar image of the object in the prototypical pose and each local error correction using one or combination of alternating minimization, projections, and constrained regularization.

12. The radar imaging system of claim 1, wherein the object moving in the scene is a person.

13. The radar imaging system of claim 1, further comprising:
   a plurality of electromagnetic sensors with a fixed aperture size, wherein the processor determines the radar reflectivity image of the object in the prototypical pose by combining measurements of each electromagnetic sensor.

14. The radar imaging system of claim 13, wherein the electromagnetic sensors are moving according to known motions, and wherein the processor adjusts the transformation of the radar reflectivity image of the object acquired by the electromagnetic sensor at the corresponding time step based on the know motion of the electromagnetic sensors for the corresponding time step.

15. The radar imaging system of claim 1, wherein the electromagnetic sensor includes one or combination of a mmWave radar, a Thz imaging sensor, and a backscatter X-ray sensor, wherein the optical sensor includes one or combination of an optical camera, a depth camera, and an infrared camera.

16. The radar imaging system of claim 1, wherein a resolution of the radar reflectivity image of the object in the prototypical pose is greater than resolutions of the radar reflectivity images of the object with deformed shapes.

17. A method for reconstructing a radar reflectivity image of a scene including an object moving with the scene, wherein the method uses a processor operatively connected to an optical sensor and an electromagnetic sensor, wherein the processor is coupled with stored instructions implementing the method, wherein the instructions, when executed by the processor carry out steps of the method, comprising:
   tracking, using the optical sensor, the object over a period of time including multiple time steps to produce, for each of the multiple time steps, a deformation of a nominal shape of the object, wherein the nominal shape of the object is a shape of the object arranged in a prototypical pose;
   acquiring, using the electromagnetic sensor, snapshots of the scene over the multiple time steps to produce a set of radar reflectivity images of the object with deformed shapes defined by the corresponding deformations of the nominal shape of the object, wherein at least two different radar reflectivity images include the object with different deformed shapes;
   determining, for each of the multiple time steps using the deformation determined for the corresponding time step, a transformation between the radar reflectivity image of the object acquired by the electromagnetic sensor at the corresponding time step and a radar reflectivity image of the object in the prototypical pose; and
   combining the radar reflectivity images of the object with deformed shapes transformed with the corresponding transformations to produce the radar reflectivity image of the object in the prototypical pose.

18. The method of claim 17, wherein the processor determines each transformation as a subsampled permutation that permutes locations of some points of the radar reflectivity image of the object in the prototypical pose and removes different points of the radar reflectivity image of the object in the prototypical pose in dependence of the deformation of the nominal shape of the object in the prototypical pose.

19. The method of claim 17, wherein the object moving in the scene is a person.

20. A non-transitory computer readable storage medium embodied thereon a program executable by a processor for performing a method, wherein the processor is operatively connected to an optical sensor and an electromagnetic sensor, the method comprising:
   tracking, using the optical sensor, the object over a period of time including multiple time steps to produce, for each of the multiple time steps, a deformation of a nominal shape of the object, wherein the nominal shape of the object is a shape of the object arranged in a prototypical pose;
   acquiring, using the electromagnetic sensor, snapshots of the scene over the multiple time steps to produce a set of radar reflectivity image of the object with deformed shapes defined by the corresponding deformations of the nominal shape of the object, wherein at least two different radar reflectivity images include the object with different deformed shapes;
   determining, for each of the multiple time steps using the deformation determined for the corresponding time step, a transformation between the radar reflectivity image of the object acquired by the electromagnetic sensor at the corresponding time step and a radar reflectivity image of the object in the prototypical pose; and
   combining the radar reflectivity images of the object with deformed shapes transformed with the corresponding transformations to produce the radar reflectivity image of the object in the prototypical pose.

* * * * *